United States Patent [19]

Orthey

[11] Patent Number: 4,650,090

[45] Date of Patent: Mar. 17, 1987

[54] MANUAL SOWING APPARATUS FOR FINE AND COARSE SEED

[75] Inventor: Gerhard Orthey, Nauroth, Fed. Rep. of Germany

[73] Assignee: Wolf-Gerate GmbH, Fed. Rep. of Germany

[21] Appl. No.: 667,413

[22] Filed: Nov. 1, 1984

[30] Foreign Application Priority Data

Nov. 25, 1983 [DE] Fed. Rep. of Germany ....... 3342705
Sep. 6, 1984 [EP] European Pat. Off. ......... 841106404

[51] Int. Cl.⁴ .............................................. A01C 7/04
[52] U.S. Cl. .................................... 221/185; 221/266;
222/167; 222/345; 222/349; 222/615; 222/623;
111/74; 111/78
[58] Field of Search ............... 222/615, 616, 622, 623,
222/624, 345, 349, 350, 167; 221/185, 266, 277,
211; 111/72, 74, 77, 78; 192/23

[56] References Cited

U.S. PATENT DOCUMENTS

| 343,286 | 6/1886 | White et al. | 111/77 |
|---|---|---|---|
| 689,508 | 12/1901 | McKnight | 111/77 |
| 1,069,083 | 7/1913 | Gibson | 222/624 X |
| 1,549,670 | 8/1925 | Kort, Jr. | 222/623 X |
| 1,879,111 | 9/1932 | Crandall | 222/167 X |
| 2,204,245 | 6/1940 | Bower | 222/167 X |
| 2,535,222 | 12/1950 | Milton | 111/77 X |
| 2,663,462 | 12/1953 | Johnson | 222/167 |
| 2,783,918 | 3/1957 | Bramblett | 222/623 X |
| 2,871,805 | 2/1959 | Behnen | 221/266 X |
| 3,031,984 | 5/1962 | Esmay | 111/74 X |
| 3,921,852 | 11/1975 | Johnson | 221/266 |
| 4,315,580 | 2/1982 | Beckworth | 11/74 X |
| 4,449,642 | 5/1984 | Dooley | 221/211 |
| 4,480,010 | 3/1891 | Clarkson | 222/623 X |

FOREIGN PATENT DOCUMENTS

| 831925 | 2/1952 | Fed. Rep. of Germany. |
| 837018 | 6/1952 | Fed. Rep. of Germany. |
| 1102465 | 10/1961 | Fed. Rep. of Germany. |
| 7913925 | 9/1979 | Fed. Rep. of Germany. |
| 273561 | 9/1970 | U.S.S.R. .................. 111/74 |

OTHER PUBLICATIONS

Pillenzwerg, Einkorndrille, 1968 Verblüffend exakter Einzelstand.
Einkorndrille IR2 Fa. Kleine, 1963 Betriebsanleltung Ersatzteil–Liste.

Primary Examiner—Joseph J. Rolla
Assistant Examiner—Edward S. Ammeen
Attorney, Agent, or Firm—Ostrolenk, Faber, Gerb & Soffen

[57] ABSTRACT

In a manual sowing apparatus a cell wheel 132 is provided which is drivable by a wheel disk 116 directly or via a reduction gear and which conveys the grain seeds from a receiving chamber via pockets disposed in the wheel to a discharge station. A plurality of cell wheels are associated with each apparatus and can be fixed via a bayonet coupling on a support drum 72. Cell wheels which are not in use can be accommodated in a receiver 104. A resilient scraper is disposed at the discharge end of the receiving chamber and prevents jamming of the cell wheel by scraping off grains when they are too large or when there are too many in a pocket, while grains projecting a slight extent can pass beneath the scraper.

4 Claims, 6 Drawing Figures

MANUAL SOWING APPARATUS FOR FINE AND COARSE SEED

The invention relates to a manual sowing apparatus of the type having a drive wheel disk adapted to roll on the ground and a cell wheel which is driven thereby. The cell wheel has pockets at the periphery for conveying seed grains from an upper receiving chamber extending over an open sector of the cell wheel to a discharge station disposed near the ground. The periphery of the cell wheel is surrounded by the receiving chamber and an arcuately curved wall extending between the receiving chamber and the discharge station. The curved wall forms a guide passage and holds the grains in their pockets. Such sowing apparatuses, saving time and seed, are a practical aid in sowing in flower or vegetable beds and cold frames.

BACKGROUND OF THE INVENTION

The problem underlying the invention is therefore to provide a manual sowing apparatus which is simple and cheap to make and which is equally suitable for fine seed and for pea-like and coarse seed. Also to ensure reliable depositing at predetermined intervals and to permit optimum utilization of the seed.

FIELD OF THE INVENTION

This problem is solved by providing, at the trailing edge of the open sector, the receiving chamber with a resilient scraper. Due to the fact that according to the invention each seed grain moves via the periphery of the feeder or cell wheel (held by the guide wall) to the exactly defined discharge point, a random dropping out depending on a great variety of possible factors is avoided and consequently a uniform hole spacing is ensured. The scraper prevents jamming and ensures a defined individual grain discharge.

According to a further development of the invention a gear arrangement is provided between the drive wheel disk and the cell wheel, the hole spacing thus being variable. For different seeds differently formed cell wheels can be used.

Further convenient developments of the invention will be apparent from the following description of the invention.

BRIEF DESCRIPTION OF THE DRAWINGS

Below, two embodiments of the invention will be described with the aid of the drawings. In the drawings.

DESCRIPTION OF PREFERRED EMBODIMENTS

Figure 1:
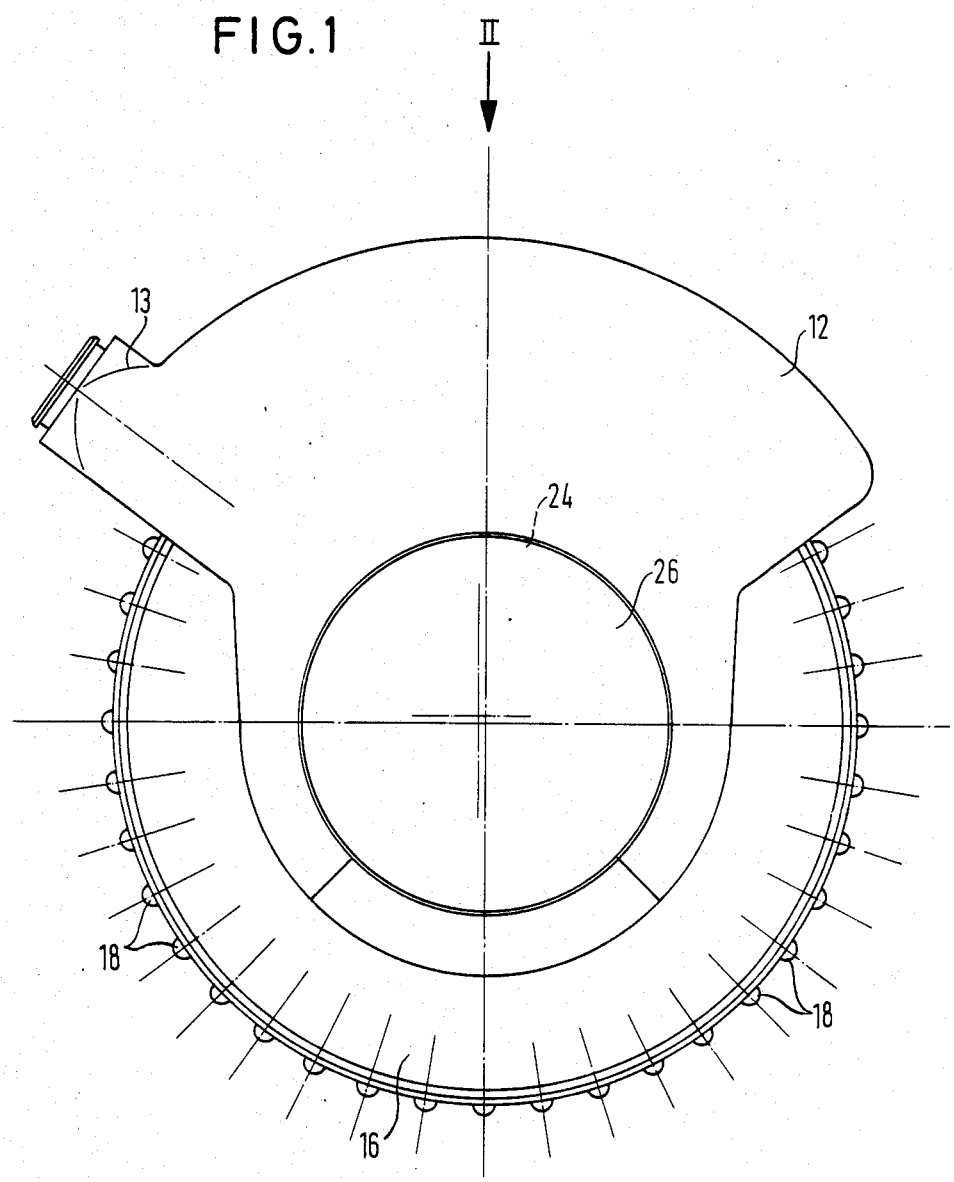
FIG. 1 is a side view of a manual sowing apparatus constructed according to the invention.
Figure 2:
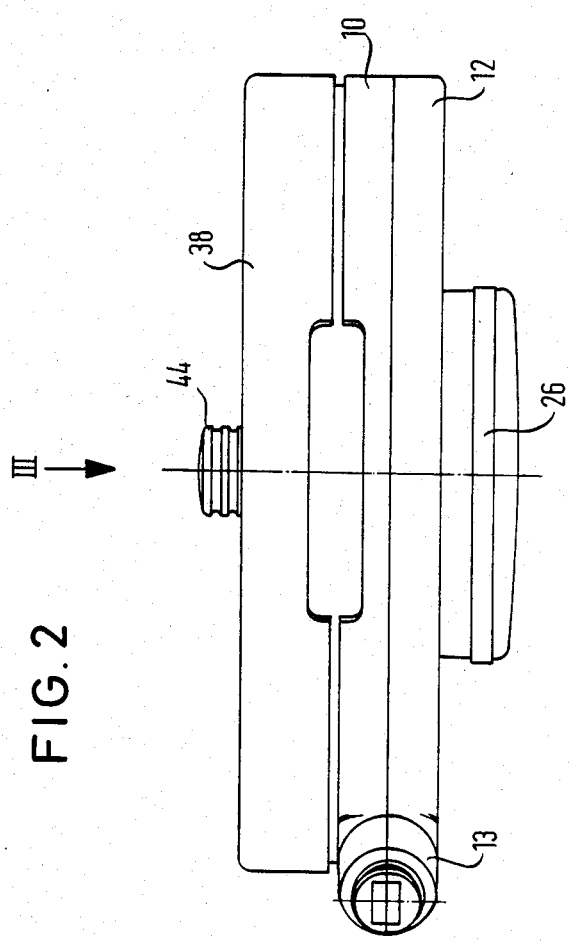
FIG. 2 shows the sowing apparatus in the direction of the arrow II of FIG. 1.

The hand sowing apparatus according to FIGS. 1 to 4 comprises two housing shells 10 and 12 which form a handle coupling 13 and are held together by screws 14. Between the housing shells 10 and 12 a wheel disk 16 provided at its outer priphery with corrugations 18 is rotatably mounted via two lateral annular webs 20. Fixedly connected to the wheel disk 16 is a central shaft butt 22 projecting on one side. On the other side an annular collar 24 projects concentrically and forms a seed container and is closable with a cover 26 engaging thereover. The annular collar 24 comprises holes 28 with which holes 30 of the cover can be brought into complete or partial coincidence by rotating said cover on the annular collar. Within the seed container radial buckets (not illustrated) are provided, each defining one sector chamber with which one of the holes 28 is associated. This sowing means disposed on the right side of the wheel disk 16 in FIG. 4 corresponds substantially to the sowing means according to DE-GM 7,913,925.

Figure 4:
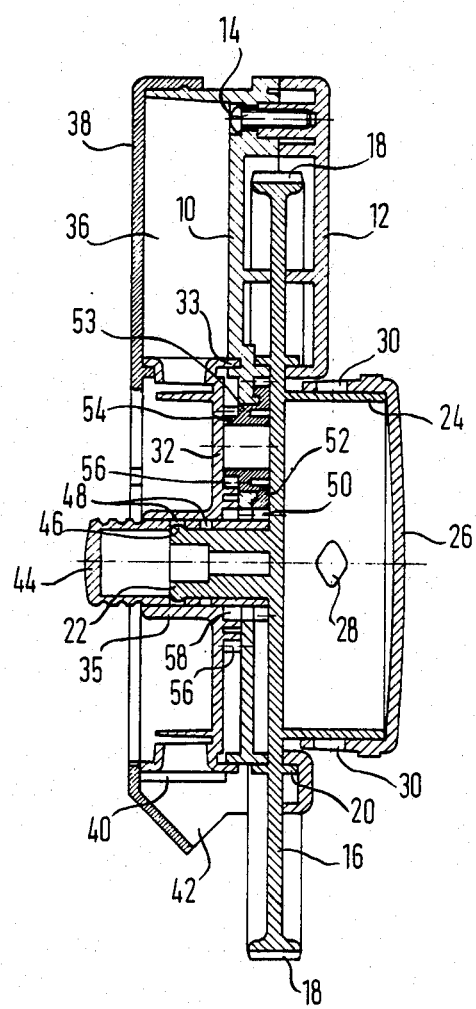
FIG. 4 is a section along the line IV—IV of FIG. 3.

On the left side of the wheel disk 16, according to FIG. 4, there is a further sowing means which serves in particular for dispensing pea-like seed or coarse seed, whilst the sowing means disposed on the right is intended for fine seed.

This further sowing means comprises a cell wheel 32 which is rotatably mounted with its outer axial annular flange 33 in an axial annular groove of the housing shell 10 and with a central hollow hub 35 surrounding the shaft butt 22 and an adjustment knob 44 mounted non-rotatably and displaceably on the shaft butt. The cell wheel 32 is provided at its outer periphery with pockets which are formed by cup-like depressions at the outer periphery and terminated by an annular web at the bottom. Above the cell wheel 32 is the receiving chamber 36 for the seed which is closed by a housing cover 38 adapted to be fitted onto a projecting web of the housing shell 10. This cover carries an integrally formed arcuate web 40 which extends a slight distance from the outer periphery of the cell wheel and defines externally the guide passage which extends between the discharge of the chamber 36 extending over a greater arc length up to a discharge chute 42 also integrally formed on a cover.

The adjustment knob 44 which is connected non-rotatably to the shaft butt 22, via a groove and tongue connection or in any other suitable manner, carries at its inner end a toothed rim 50 which meshes in the position illustrated in FIG. 4 with a gear 52 which is rotatably mounted by means of an annular collar 53 in the housing shell 10. Connected to the gear 52 is a further gear 54 of smaller diameter which meshes with an external toothed rim 56 formed on the cell wheel 32. Concentrically with the external toothed rim 56, the cell wheel 32 carries an internal tooth rim 58 into which the toothed rim 50 of the adjustment knob 44 can be coupled by axial displacement (to the left according to FIG. 4). The two coupling positions of the adjustment knob are limited by warts 46 which project from the shaft butt 22 outwardly and engage in axially spaced holes 48 of the adjustment knob sleeve.

When the adjustment knob 44 is drawn outwardly (to the left in FIG. 4) and its toothed rim 50 engages in the internal toothed rim 58 of the cell wheel 32 the latter rotates with the same speed as the wheel disk 16 rolling on the ground. If however the adjustment knob is in the position shown in FIG. 4 the drive of the cell wheel is via the gear 52, the further gear 54 and the external toothed rim 56 with a reduction ratio of preferably about 3:1. This enables the distance between two successively discharged seeds to be adjusted.

Figure 3:
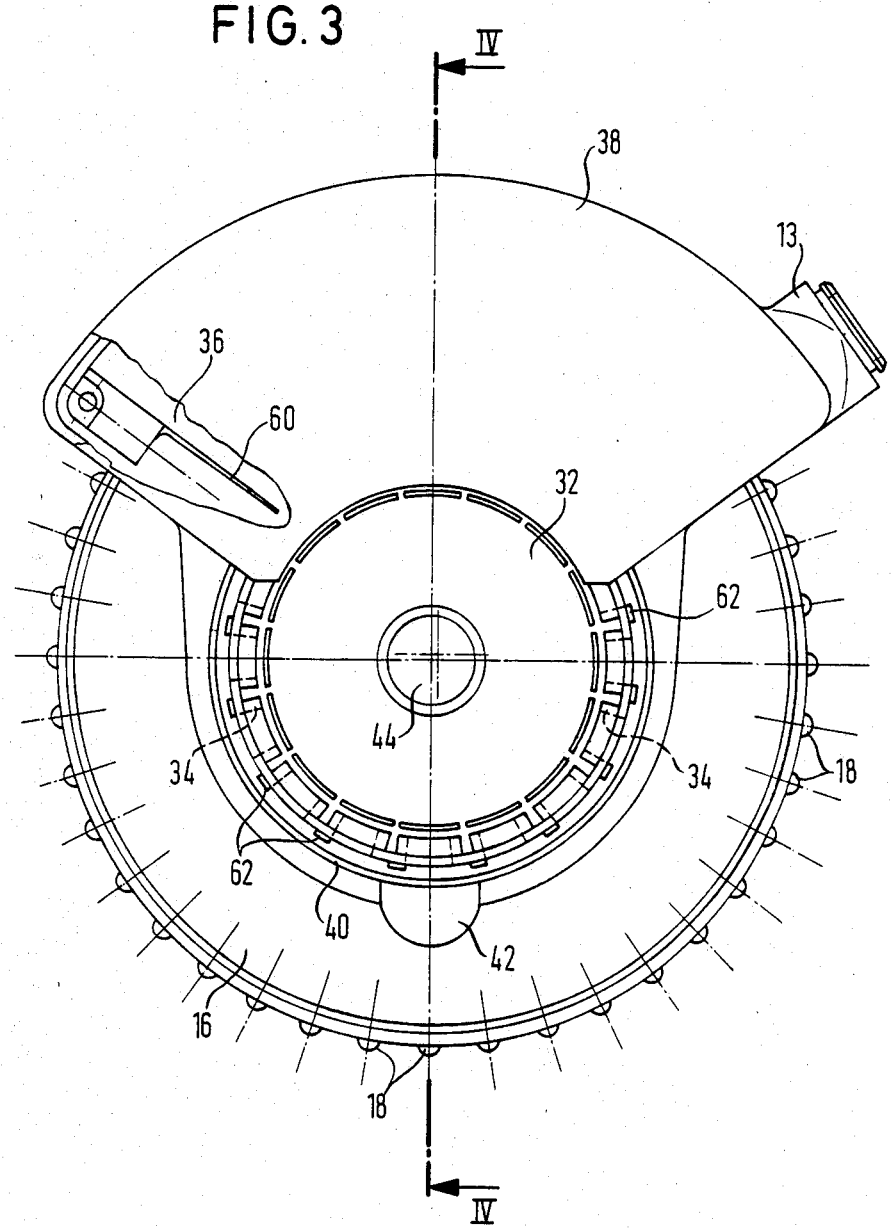
FIG. 3 is a back view of the sowing apparatus in the direction of the arrow III of FIG. 2.

As apparent from FIG. 3 at the trailing end of the receiving chamber 36, a scraper blade 60 is mounted which is adjoined by the arcuate guide wall 40 of the guide channel. This scraper blade permits only a single grain to enter a pocket even when said single grain does not completely fill the pocket. Instead of said scraper 60 or in addition thereto, in the region of the entry of the guide channel, a guide roller may be disposed which comprises at the periphery grooves or teeth and is mounted in the housing. This roller is driven by meshing with a rotating member, for example the cell wheel or one of the gear wheels of the gearing. The arrangement is such that this guide roller (not illustrated in the drawings) runs oppositely to the cell wheel 32 driven by the wheel disk 16. This guide roller rotates four to five times faster than the cell wheel.

In the filling section in the receiving chamber 36, the cell wheel 32 rotates over a relatively wide sector and in said sector the individual seed grains drop under gravity into the cells. The scraper blade 60 or the guide roller ensures that the receiving chamber 36 is closed off towards the outside. In addition only as many individual grains as fit into a pocket are released above the latter (and not grains which would project therebeyond). As a rule, each pocket receives only one seed grain.

To prevent coarse seed from forming a bridge in the receiving chamber from which an individual grain cannot detach itself, laterally of the pockets and between the latter, mixing vanes 62 indicated in FIG. 3 can be provided at the outer periphery of the cell wheel.

Due to the guide channel, whose limiting wall 40 keeps the grains in their pockets, the individual grains only leave the pockets in the lower region via the chute 42, in each case with the same slight drop height. With low grain weights larger drop heights of for example 5 cm can lead to different grain intervals because the individual seeds can bounce back from the ground.

Figure 5:
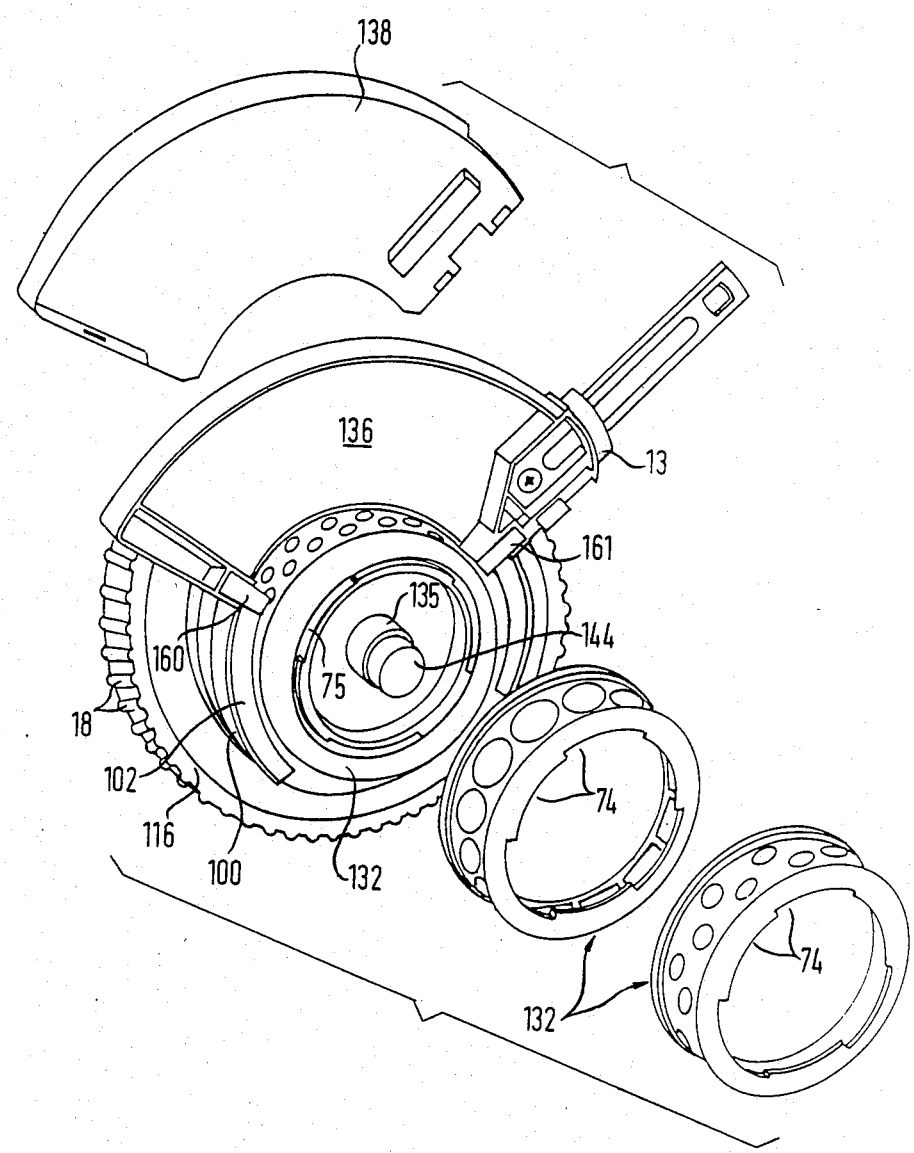
FIG. 5 is a perspective exploded view of a modified embodiment.
Figure 6:
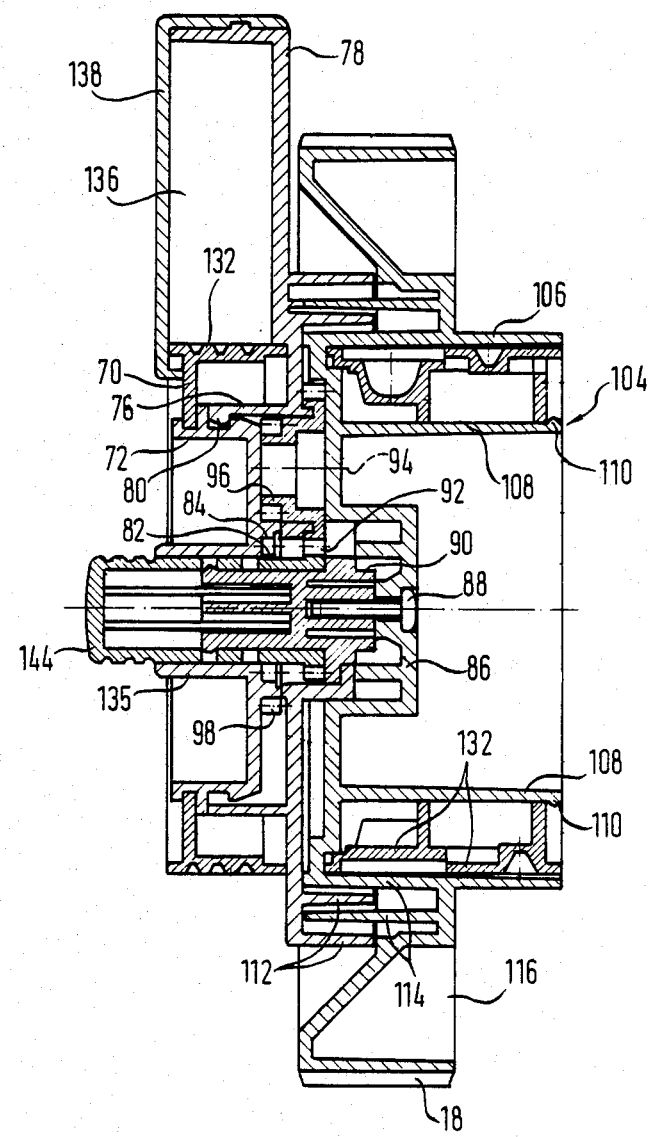
FIG. 6 is a vertical axial section of the hand sowing apparatus according to FIG. 5.

In the embodiment according to FIGS. 5 and 6, the annularly formed cell wheel 132 can be interchangeably fitted by means of an inner flange 70 on a support drum 72 via a bayonet connection 74, 75. This support drum 72 is mounted in a cylindrical annular web 76 of the housing 78 and axially secured by a detent means 80. The support drum comprises a hollow hub 135 which guides the gear adjustment knob 144 passing axially therethrough. This adjustment knob carries an external toothed rim 82 which in the position illustrated (adjustment knob 144 pulled to the left according to FIG. 6) meshes with an internal toothing 84 of a drum flange of the support drum 72 because the hub 86 of the wheel disk 116 is connected via a screw 88 and axial coupling dogs 90 non-rotatably to the adjustment knob 144. This provides in this position according to FIG. 6 a direct transmission between wheel disk 116 and cell wheel 132. If the adjustment knob 144 is displaced to the right according to FIG. 6 the toothed rim 82 comes out of engagement with the support drum and engages in a gear 92 which is rotatably mounted about an axis 94 in the housing 78. The gear 94 is fixedly connected to a gear 96 of smaller diameter which meshes with an external toothed rim 98 of the support drum 72.

In the reduction position, the wheel disk 116 via the external toothed rim 82 connected non-rotatably thereto, drives the gear 92 of the intermediate shaft and the gear 96 non-rotatably connected thereto drives via the external toothed rim 98 the cell wheel 132 with reduced speed.

The receiving chamber 136 is sealed by a transparent sector-shaped cover 138 which by rotating can be brought into locking engagement with the housing. As apparent from FIG. 5, the receiving chamber 136 is open radially inwardly and is bordered at this point by the cell wheel 132. At the trailing end of the receiving container 136, the block 160 of elastomeric material is inserted into a housing guide, said block 160 serving as scraper and lying at a small distance from the outer annular surface of the cell wheel, wiping off grains which are too large and allowing grains which project only a small amount from the pockets of the cell wheel to pass. A similar block 161 is disposed at the trailing end of the receiving chamber to prevent grains emerging at this point.

From the scraper block within the housing flange 100 forming the arcuate guide passage, an arcuately curved strip 102 also consisting of elastomeric material extends and forms a resilient outer wall for the grains entrained by the cell wheel.

The wheel disk 116 comprises a receiver 104 for receiving the cell wheels 132 which are not in use. The cell wheels 132 associated with a hand sowing apparatus differ in regard to number, size and distribution of the pockets intended for receiving the grains at the peripheral edge. This is particularly apparent from FIG. 5. The two cell wheels 132, which are not required, are placed in the receiver 104 which is defined at the outside by a cylindrical flange 106 and comprises at the inside three equally angularly spaced radially inwardly resilient curved webs 108 over which the inner flange 70 of the cell wheels can be pushed with the bayonet recess 74. Axial locking is by a detent nose 110.

As apparent from FIG. 6, cylindrical annular webs 112 of the housing and 114 of the wheel disk engage in each other and represent a rotary mounting, an axial displacement therebetween being possible for effecting the switching operation.

I claim:

1. Manual sowing apparatus comprising a drive wheel disk (16) adapted to roll on the ground and a cell wheel (32) which is driven by said drive wheel disk and comprises at the periphery pockets (34) for conveying seed grains from an upper receiving chamber (36) extending over an open sector of the cell wheel to a discharge station disposed near the ground, the periphery of the cell wheel being surrounded by the receiving chamber (36) and an arcuately curved wall (40) extending between the receiving chamber and the discharge station and forming a guide passage holding the seed grains in their pockets (34), wherein at a trailing edge of the open sector, the receiving chamber (36) is provided with a resilient scraper (60: 160) which either scrapes off seed grains projecting from the pockets (34) or by slight deformation allows the seed grains to pass when the projecting portion is relatively small; said seed grains comprising coarse seed and fine seed, said cell wheel (32) dispensing said coarse seed, and a drum (24, 26) dispensing said fine seed, said drum being driven by the drive wheel disk (16), said cell wheel (32) being disposed on one side of the wheel disk (16) and the sowing drum (24, 26) on the other side of the wheel disk (16).

2. Manual sowing apparatus comprising a drive wheel disk (16) adapted to roll on the ground and a cell wheel (32) which is driven by said drive wheel disk and comprises at the periphery pockets (34) for conveying seed grains from an upper receiving chamber (36) extending over an open sector of the cell wheel to a discharge station disposed near the ground, the periphery of the cell wheel being surrounded by the receiving chamber (36) and an arcuately curved wall (40) extending between the receiving chamber and the discharge station and forming a guide passage holding the seed grains in their pockets (34), wherein at a trailing edge of the open sector, the receiving chamber (36) is provided with a resilient scraper (60: 160) which either scrapes off seed grains projecting from the pockets (34) or by slight deformation allows the seed grains to pass when the projecting portion is relatively small;

wherein between the drive wheel disk (16) and the cell wheel (32) a changeable reduction gearing is provided, in the form of a toothed-wheel gearing, said drive wheel disk (16) being non rotatably connected to a central shaft butt (22); an axially displaceable adjustment knob having an external toothed rim being non-rotatably fixed to said central shaft butt, said adjustment knob (44) being surrounded by a hollow hub (35) fixed to said cell wheel; whereby a direct coupling or a coupling via an intermediate shaft can be effected between the toothed-wheel gearing of the drive wheel disk and the cell wheel by the adjustment knob.

3. Manual sowing apparatus comprising a drive wheel disk (116) adapted to roll on the ground and a cell wheel (132) which is driven by said drive wheel disk and comprises at the periphery pockets (34) for conveying seed grains from an upper receiving chamber (136) extending over an open sector of the cell wheel to a discharge station disposed near the ground, the periphery of the cell wheel being surrounded by the receiving chamber (136) an arcuately curved wall (102) extending between the receiving chamber and the discharge station forming a guide passage holding the seed grains in their pockets (34), wherein at a trailing edge of the open sector, the receiving chamber (136) is provided with a resilient scraper (60: 160) which either scrapes off seed grains projecting from the pockets (34) or by slight deformation allows the seed grains to pass when the projecting portion is relatively small; and wherein a housing (78) is provided for the drive wheel disk (116) said drive wheel disk (116) being mounted with cylindrical annular webs (114) in said housing (78) having a hub (86) connected thereto; a support drum (72) having the cell wheel (132) connected thereto; an adjustment knob (144) having an external toothed rim and being non-rotatably connected to said hub (86); a hollow hub (135) connected to said support drum (72) and surrounding said adjustment knob; and a reduction gearing between the drive wheel disk (116) and the cell wheel support drum (72); whereby a direct coupling or a coupling via the reduction gearing can be effected between the drive wheel disk and the cell wheel support drum by the adjustment knob.

4. Manual sowing apparatus according to claim 3 wherein mixing vanes are disposed laterally of the pockets (34) and between the latter.

* * * * *